United States Patent [19]

Gregg et al.

[11] Patent Number: 5,043,967
[45] Date of Patent: Aug. 27, 1991

[54] STRUCTURED DATA STORAGE METHOD AND MEDIUM

[75] Inventors: Leon E. Gregg; Randy K. Rolfe, both of Rochester, Minn.

[73] Assignee: International Business Machines Corporation, Armonk, N.Y.

[21] Appl. No.: 570,035

[22] Filed: Aug. 20, 1990

[51] Int. Cl.5 .................... G06F 15/00; G11C 13/00
[52] U.S. Cl. ...................................... 369/59; 369/32; 365/230.01; 364/900
[58] Field of Search ................. 369/32, 48, 59, 58; 364/200 MS File, 900 MS File

[56] References Cited

U.S. PATENT DOCUMENTS

| 4,575,827 | 3/1986 | Kulakowski . |
| 4,682,318 | 7/1987 | Busby . |
| 4,733,386 | 3/1988 | Shimoi . |
| 4,791,623 | 12/1988 | Delotte . |
| 4,792,936 | 12/1988 | Picard . |
| 4,792,937 | 12/1988 | Picard . |
| 4,827,462 | 5/1989 | Flannagan et al. . |

FOREIGN PATENT DOCUMENTS

325823A1 8/1989 European Pat. Off. .
89/01663 2/1989 PCT Int'l Appl. .

OTHER PUBLICATIONS

IBM Technical Disclosure Bulletin; D. D. Grossman, Updating Non-Erasable Storage, Jun. 1981, 775-776, vol. 24, No. 1B.
IBM Technical Disclosure Bulletin; W. J. Flannagan et al., Incremental Directory Indexes in a Write-Once Recording Environment, Mar. 1988, 344-350, vol. 30, No. 10

Primary Examiner—Roy N. Envall, Jr.
Assistant Examiner—Hindi Nabil
Attorney, Agent, or Firm—Philip M. Kolehmainen; J. Michael Anglin; Bradley A. Forrest

[57] ABSTRACT

A WORM data storage medium includes primary and secondary data storage areas in which data and pointers to allocated but unwritten update areas are written. Original and updated data is written in a write sequence or chain of primary data areas separated by branched secondary data storage areas. The most recent updated data is found in a two level search of primary and then secondary data storage areas in order to save time by searching only those secondary areas where the most recent update exist.

23 Claims, 1 Drawing Sheet

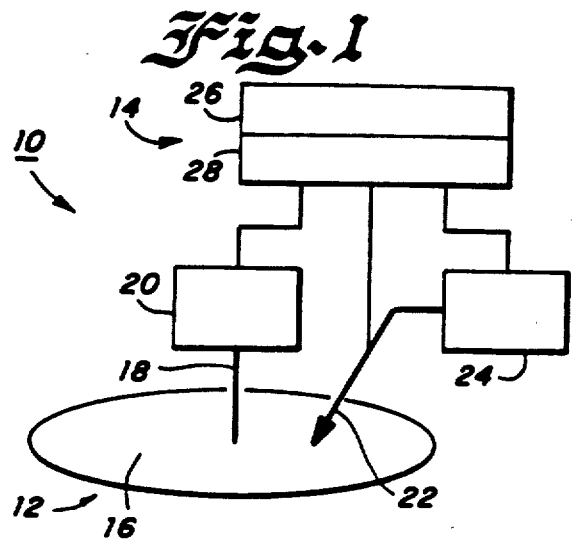
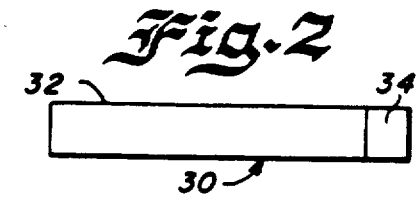
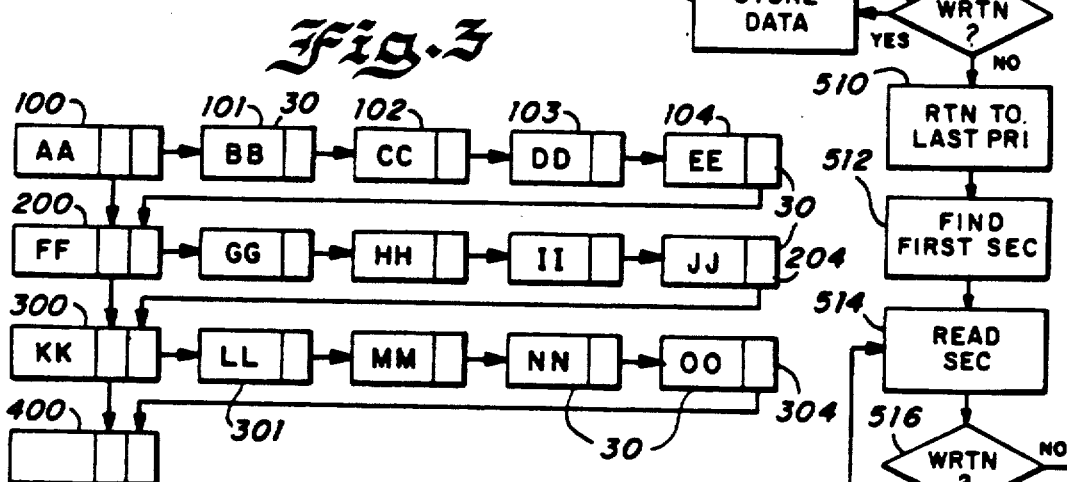
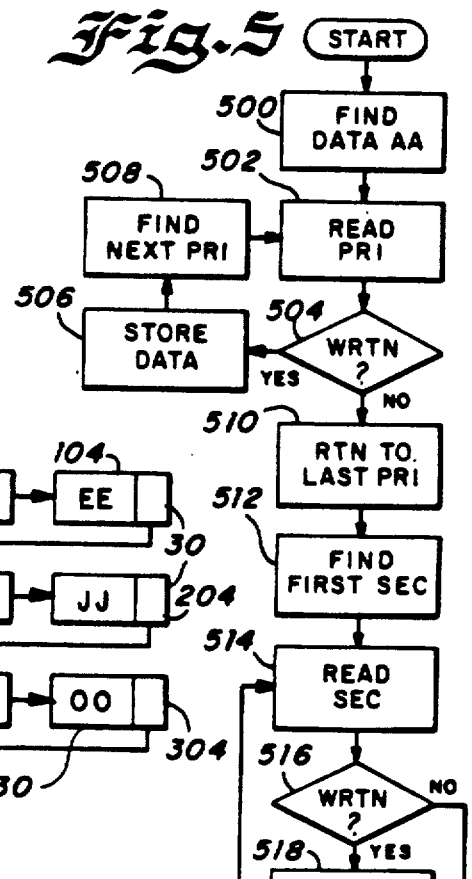
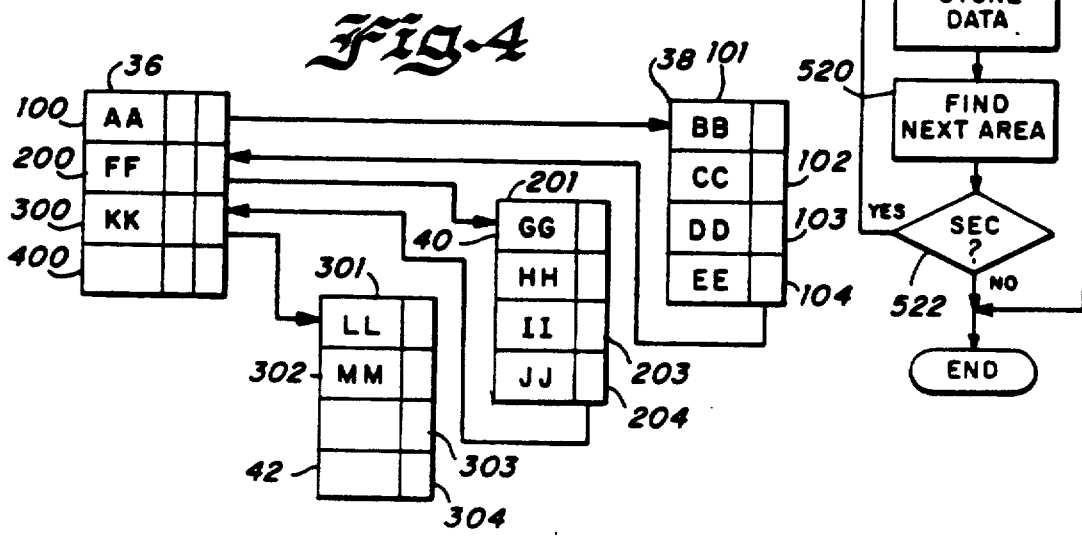

STRUCTURED DATA STORAGE METHOD AND MEDIUM

FIELD OF THE INVENTION

This invention relates to the storage of data on media such as write once read many (WORM) media, and more particularly to media structures and methods in which the most recent updated data can be located quickly.

DESCRIPTION OF THE PRIOR ART

Computers often include memory storage units having media on which data can be written and from which data can be read for later use. In the past many memory storage media have been magnetic. A characteristic of a magnetic medium is that when data is updated the original data can be overwritten. Usually there is no need to retain a prior version of data that has been updated.

The advent of write once read many (WORM) media such as optical disks has introduced difficulties in updating data and in locating the current or most recent updated data. Because of the large storage capacity of many WORM media, extensive data updates are possible and should be anticipated. On a WORM medium, each data area can be written only once. After an area is written, no further changes are possible. It is not practical to read an entire medium in order to find the most recent version of needed data. As a result, an area containing original data that may be subsequently updated must include a way to locate the updated data that may exist. Moreover, provision to find future versions of the data must be incorporated into the original data when it is first written. Similar considerations apply in any storage medium system in which data once written is retained on the medium for archival or other purposes.

A common way to meet the requirement for finding subsequent updates is to allocate space on the medium for a furture update when the current data is written. A pointer to the media update address is written with the current data. With each update, the process is repeated and every data storage area includes a pointer to a subsequent data storage area. Each data update sequence includes a string of data storage areas holding successive updates and terminating in a data storage area that is allocated and available but not yet used. To find the most recent version of the data, the string of areas is read until the unused final area is identified. It is then known that the penultimate data area contains the current data. A problem with this technique is that the repeated accessing of the medium required to read the string of data storage areas takes too much time.

One way to avoid reading an entire string of obsolete data storage areas is to write a pointer to the last version of the data. But a pointer cannot be altered after it is written. Thus, a new pointer or chain of pointers must be written each time the data is updated. This would result in a chain of pointers, only the last of which can be used to locate the current data. To find the current data, the chain of pointers must be read from beginning to end, and this does not overcome the problem of repeated medium access after numerous updates.

Another approach to reducing the number of accesses is to allocate a large area when original data is written. The area is selected to be large enough for the original data as well as a number of updates. Access time is faster because the entire area is physically contiguous at one location on the medium and can be read in a single access. When the original and updated data are read with one command, the search for current data can be made within the main system memory and the time required is less than that resulting from repeated reading of the medium. A difficulty with this approach is choosing the size of the storage area to be allocated. If it is too small, then the disadvantages of multiple areas are not avoided. If it is too large, then space on the medium is wasted because a large amount of unused space is allocated and unavailable for other data.

SUMMARY OF THE INVENTION

Among the important objects of the present invention are to provide a method and a structure for storing data on a medium and accessing that data so that the most recent updated version of data can be located quickly with minimum disk access; to provide a structure and method in which it is not necessary to read an entire string of data updates to find the most recent; to provide a structure and method particularly advantageous for data storage media in which data once written is not changed; to provide a structure and method in which it is not necessary to allocate large blocks of the medium for future updates when data is written; to provide a structure and method in which it is not necessary to update a pointer to the most recent data when the data is written; and to provide a structure and method overcoming disadvantages of those used in the past.

In brief, a WORM data storage medium structured for fast retrieval of current data in accordance with the present invention includes a plurality of primary data storage areas defined in the storage medium. The primary data storage areas have a sequence. A plurality of secondary data storage areas are defined in the storage medium, and each of the secondary data storage areas is assigned to one of the primary data storage areas. Original data is stored in the first primary data storage area and sequential updates of the original data including a most recent update are stored in the primary and secondary data storage areas in an order determined by storing updates in each secondary data storage area assigned to one primary data storage area before storing an update in the sequentially next primary data storage area. The most recent update is stored in a data storage area containing a pointer to the next in order data storage area that is unwritten.

In brief, the present invention provides a method for writing and finding original and updated data on a data medium having numerous discrete data storage areas without overwriting updated data. The method includes allocating a group of primary data storage areas having a known number of areas and a predetermined sequence of areas and writing original data and subsequent updates to the primary data storage areas in the predetermined sequence. At the time that data is written to any one of the primary data storage areas, a group of secondary data storage areas having a known number of areas and a predetermined sequence of areas are assigned to that one primary data storage area. Data is written to the secondary data storage areas assigned to the one primary data storage area before writing data to the next sequential primary data storage area. The primary data storage areas are read in sequence without reading their corresponding secondary data storage areas in order to find the first primary storage area in which data is not written. The most recent updated data is found by reading the preceding primary data storage area and the secondary data storage areas assigned to the preceding primary data storage area until an unwritten data storage area following the most recent data is found.

BRIEF DESCRIPTION OF THE DRAWINGS

The invention together with the above and other objects and advantages may be best understood from the following detailed description of the embodiments of the invention shown in the accompanying drawings, wherein:

FIG. 1 is a schematic and block diagram of a computer or data processing system having a data storage medium structured in accordance with the present invention and capable of carrying out the method of the present invention;

FIG. 2 is a diagrammatic view of a data storage area allocated on the data storage medium;

FIG. 3 is a diagrammatic view of an arrangement of data storage areas on the data storage medium in accordance with the structure and method of the present invention;

FIG. 4 is a diagrammatic view of another arrangement of data storage areas on the data storage medium in accordance with the structure and method of the present invention; and FIG. 5 is a flow diagram illustrating the way the structure and method of the present invention are used to locate the most recent update of stored data.

DETAILED DESCRIPTION OF THE INVENTION

In FIG. 1 there is shown a partly schematic block diagram of parts of a computer data processing system 10 including a data storage medium generally designated as 12 and a data utilizing device generally designated as 14. In the preferred embodiment of this invention, the medium 12 is embodied in a disk 16 that is rotated about its axis 18 by a disk drive motor 20, although other configurations such as tape or matrixed memory arrays of various kinds may be used. Although the present invention provides advantages with media and disks of various types, the problems solved by the invention may be most acute with media in which data stored in the medium is not overwritten even if updated. One example of such a medium is a read once, write many (WORM) disk such as an optical data storage disk. Another example is a data storage system in which all recorded data is preserved for archival or other purposes.

The data storage area of the disk 16 is subdivided into numerous functionally indivisible minimum data areas, each of which is individually addressable and can contain one block or quantum of stored information. On a disk medium, the minimum data areas, called sectors, are arrayed in a pattern around the axis 18. The sectors can be accessed by a read/write head 22 movable radially with respect to the rotating disk 16 by a head drive motor 24 selectively into registration with any of the numerous data areas.

Data utilization device 12 typically includes a processor 26 that generates or receives and passes data to be stored in the data areas of disk 16 for subsequent access and use. A disk controller 28 is coupled between the processor 26 and the motors 20 and 24 and the head 22. The disk controller 28 controls the operations of moving the head into registration with selected data areas, writing data to the data areas, reading data from the data areas, sensing status and others, all under the control of the processor 26. In the presently preferred arrangement, the disk 16 includes sectors each having a storage capacity of 1024 bytes with a total of about 325 megabytes of capacity per side, but other sector and disk sizes can be used. More than one disk 16 using one or both sides accessed by more than one read/write head 22 may be used for increased capacity if desired.

In the structure and method of the present invention, areas are allocated on the medium 16 for the storage of data and pointer information. One data storage area 30 is shown diagrammatically in FIG. 2. In the preferred arrangement, the data storage area 30 consists of a single sector divided functionally into a data storage portion 32 and a pointer portion 34. Information such as original data or updates of the data are written by head 22 onto the storage portion 32. Address information pointing to one or two other data storage areas 30 is written by head 22 onto the pointer portion 34. Information can be written to area 30 only one time. Data and pointer information must be written in the same operation onto portions 30 and 32. When data and address information is written onto the portions 32 and 34, it is not erased or overwritten and is functionally permanent in the method and structure of the invention.

FIG. 3 shows an array of data storage areas 30 allocated onto the medium 12 and containing data and pointers written in accordance with the method of the invention. In this array, there are two different classes of data storage areas: primary data storage areas 100, 200, 300 etc., and secondary data storage areas that branch from the primary data storage areas. The secondary data storage areas are designated by reference numerals having the same first digit as the root primary data storage area.

When a block of original data AA is written onto the medium 12, primary area 100 is allocated. At the time that data AA is written onto the storage portion 32 of the primary area 100, a second primary area 200 and a secondary data storage area 101 are also allocated. Pointers to the allocated areas 200 and 101 are indicated by arrows in FIG. 3 and are written in the pointer portion 34 of the primary data storage area 100. Neither the data nor the pointers can be altered after they are written onto the medium 12. Until it is updated, data AA is the current or most recent data.

Data AA is subsequently updated with data BB, CC, DD, etc., with a total of fifteen updates being shown in the array of FIG. 3. Data BB is written on the secondary area 101 and not on the second primary area 200. When data BB is written, a next sequential, second secondary data storage area 102 is allocated and a pointer to that area 102 is written in the secondary data storage area 101. After this first update, the original data AA is no longer current and the data BB is the most recent update. At this point, areas 100, 200, 101 and 102 are allocated, areas 100 and 101 contain data, areas 200 and 102 are empty or unwritten, and pointers to those areas are present in areas 100 and 101 respectively.

The second updated data CC is written on secondary data storage area 102 and area 103 is allocated and identified for access by a pointer in area 102. This sequence of writing updates on secondary data storage areas branched from primary area 100 continues until data EE is written on the last secondary data storage area 104 branched from the primary area 100. When data update EE is written on area 104, a pointer is written on area 104 to the address of the preexisting second data storage area 200.

The next data update FF is written in the second primary data storage area 200. As was done when area 100 was written, a next primary area 300 and a first branched secondary area 201 are allocated on the medium 12 and identified with pointers in area 200 at the time that data FF is written. The sequence of writing updates in secondary areas branched from primary areas before writing in the next primary area continues as additional updates are made to the data. In the status seen in FIG. 3, the primary data storage area 400 is allocated but unwritten and the data OO is the current or most recent version.

This sequence of allocating and writing original and updated data results in a data write order that is a chain of data storage areas containing both primary and secondary data storage areas. Any two sequential primary areas are separated in the data write order by all of the secondary data storage areas branched from the prior primary area. Although four secondary areas are shown in FIG. 3 branched from each primary area, more or fewer may be used.

In FIG. 4 there is illustrated a different form of the array seen in FIG. 3. The difference is that in FIG. 3 the primary and secondary data storage areas are allocated individually as needed, and may be located in discontinuous places on the medium 12. In FIG. 4 the primary and secondary areas are allocated in groups that are contiguous and adjacent to one another on the medium 12. Thus in FIG. 4, the primary data storage areas 100-400 are parts of a contiguous group 36, the secondary data storage areas 101-104 are part of a contiguous group 38, the secondary data storage areas 201-204 are part of a contiguous group 40, and the secondary data storage areas 301-304 are part of a contiguous group 42. The reason for allocating the data storage areas in contiguous groups is that an entire group can be read from medium 12 by head 22 with a single command, and access time is shortened. This advantage may outweigh the disadvantage of having additional allocated but unwritten data storage areas.

Another difference between FIGS. 3 and 4 is that in the latter, there are thirteen rather than fifteen updates of the original data. The data write order is the same as described with reference to FIG. 3. Because groups of data storage areas are contiguous, it may be possible to dispense with pointers except for pointers that point between groups. FIG. 4 illustrates the status of the array when the most current data update MM is written in an intermediate secondary data storage area. The next secondary data storage area 303 is allocated but unwritten.

The most recent data is always located in the write order or chain immediately prior to the allocated and unwritten data storage area addressed by a pointer in the area in which the most recent data is found. It would be possible to search for this unwritten and allocated area by reading through all of the written data storage areas in the same order in which they were written. However, this would require a relatively large number of accesses to the medium 12 and would be slow.

The present invention provides a fast way to find the most recent updated data. Rather than reading all of the written data, the hierarchy of data storage areas is used to speed the search. Only the primary data storage areas are read initially. When an allocated but unwritten primary data storage area is found, the location of the last update is limited to the group of data storage areas including the prior primary area and its branched secondary areas. Only those secondary areas need to be read individually in a second stage of the search to isolate the next to be written data storage area following the desired most recent update.

FIG. 5 is a flow chart of steps that may be followed to find the most recent data in the data storage area array of FIG. 3 or FIG. 4. When the sequence is started by a call for data from the processor 26 and controller 28, the first step indicated by logic block 500 is to find the original data stored on the medium 12. The address of the first primary data storage 100 may come from a directory on the medium 12 or may be fixed. The head 22 is moved into registration with the area 100 and, as indicated by block 502, the primary data storage area is read by the head 22. A decision is made in block 504 whether the primary data storage area is written or unwritten. In many WORM media, an indication called a blank check is returned when an unwritten area is read, and this indication can be used to decide if an area is written. If written, as would be the case in the first primary data storage area 100, the read data is stored as a candidate to be the most recent version of the data as indicated in block 506.

After the data from a primary data storage area is stored as seen in block 506, the pointer written in that primary data storage area is used to find the sequentially next primary storage area as indicated in block 508. The operation returns to block 502 and the search continues in the loop containing blocks 502-508 until the first unwritten primary data storage area is found. In each iteration, when a written area is read, the data written there is stored in place of the prior stored data as the new candidate for the most recent update, see block 506.

When an unwritten primary storage area is read, the result is a branch from block 504 to block 510 and a return to the prior written primary data storage area. For example, in FIG. 4, this would correspond to finding unwritten area 400 and returning to area 300. Then, as seen in block 512, the pointer in the primary data storage area is used to find the first branched secondary data storage area, and then that area is read as indicated in block 514. A decision is made in block 516 whether the secondary area is written and, if so, the data read in that area is stored in place of the previously stored potential current update. The pointer in the secondary data storage area is followed to the next data storage area as seen in block 520, and a decision is made in block 522 whether the next area is a primary or a secondary data storage area. If it is a secondary area, the loop of blocks 514-522 is repeated until an unwritten secondary data storage area is found (block 516) or until the search returns to the next unwritten primary data storage area (block 522). In either case, the procedure terminates with the most recent update stored as a result of the operation indicated by block 506 or block 518.

If the search for the most recent update is made in response to a request to read the data for use by the processor 26, the stored data is transferred through the controller 28 at the conclusion of the search. If the search is made in preparation for writing yet another update, it is not necessary to store the read data, and the new update is written onto the allocated but unwritten data storage area found in the search.

In the array of FIG. 4, as indicated above, pointers between contiguous areas may be included or omitted. If omitted, the find steps indicated by blocks 508 and 520 may be carried out simply by reading data areas in physical sequence rather than by following pointers.

The structure and method of this invention contemplate an array that is a hierarchy of primary and secondary data storage areas. If sufficient updates are anticipated, this concept can be extended to more layers of data storage areas. For example, a group of tertiary data storage areas can branch from each secondary data storage area, and the search for the most recent data can be made in three stages. In this case, the primary and secondary areas are searched in the manner seen in FIG. 5, and then the tertiary areas branched from the last written secondary area are searched to find the current data.

What is claimed is:

1. A method for writing and finding original and updated data on a data medium having numerous discrete data storage areas without overwriting updated data, said method comprising the steps of:

allocating a group of primary data storage areas having a known number of areas and a predetermined sequence of areas;

writing original data and subsequent updates to the primary data storage areas in the predetermined sequence;

at the time that data is written to any one of the primary data storage areas, assigning to that one primary data storage area a group of secondary data storage areas having a known number of areas and a predetermined sequence of areas;

writing data to the secondary data storage areas assigned to the one primary data storage area before writing data to the next sequential primary data storage area;

reading the primary data storage areas in sequence without reading their corresponding secondary data storage areas in order to find the first primary storage area in which data is not written; and finding the most recent updated data by reading the preceding primary data storage area and the secondary data storage areas assigned to the preceding primary data storage area.

2. A method as claimed in claim 1 in which said allocating step comprises allocating primary data storage areas that are contiguous on the medium and can be read with a single command.

3. A method as claimed in claim 1 in which said assigning step includes assigning secondary data storage areas that are contiguous on the medium and can be read with a single command.

4. A method as claimed in claim 3 wherein said assigning step additionally includes writing a pointer in the one primary data storage area pointing to the assigned group of secondary data storage areas.

5. A method as claimed in claim 1 in which said finding step includes locating the first secondary data storage area in which data is not written, and reading the data in the next previous data storage area.

6. A method as claimed in claim 1 further comprising writing a pointer to the next sequential data storage area at the time that data is written in any data storage area.

7. A method for storing and accessing data on a data storage medium comprising the steps of:

allocating a plurality of areas of the medium as first primary data storage areas;

establishing primary data area pointers between the first primary data storage areas to define a data storage sequence among the primary data storage areas;

writing initial data in a sequentially first primary data storage area;

allocating at least one other area of the medium as a secondary data storage area branched from the first primary data storage area;

establishing a secondary data area pointer from the first primary data storage area to its branched secondary data storage area;

writing a first update of the data in the secondary data storage area branched from the first primary data storage area;

writing a later update of the data in the sequentially second primary data storage area;

allocating at least one other area of the medium as a secondary data storage area branched from the second primary data storage area;

establishing another secondary pointer from the second primary data storage area to its branched secondary data storage area; and finding the most recent updated data by searching for an unused data area in the pointed sequence of primary data storage areas, then returning to the last used primary data storage area, and then searching for an unused data storage area in the secondary data storage area dedicated to the last used primary data storage area.

8. A WORM data storage medium structured for fast retrieval of current data comprising:

a plurality of primary data storage areas defined in the storage medium;

means defining a sequence of said primary data storage areas;

a plurality of secondary data storage areas defined in the storage medium;

means assigning each of said secondary data storage areas to one of the plurality of primary data storage areas;

original data stored in the sequentially first of said primary data storage areas; and a plurality of sequential updates of said original data including a most recent update;

said plurality of updates being stored in said primary and secondary data storage areas in an order determined by storing updates in each secondary data storage area assigned to one primary data storage area before storing an update in the sequentially next primary data storage area;

said most recent update being stored in a data storage area containing a pointer to the next in order data storage area;

said next in order data storage area being unwritten.

9. A structured data storage medium as claimed in claim 8 wherein said sequence defining means comprises a primary pointer in each primary data storage area pointing to the sequentially next primary data storage area.

10. A structured data storage medium as claimed in claim 9, said assigning means comprising a secondary pointer in each primary data storage area pointing to at least one of the secondary data storage areas assigned to that primary data storage area.

11. A structured data storage medium as claimed in claim 10 wherein a plurality of said secondary data storage areas are assigned to each said primary data storage area, and said assigning means includes additional pointers in the secondary data storage areas pointing to the next ordered data storage area.

12. A structured data storage medium as claimed in claim 8 wherein said primary data storage areas are physically contiguous areas and said sequence defining means comprises the physical order of the primary data storage areas.

13. A structured data storage medium as claimed in claim 12 wherein a plurality of said secondary data storage areas are assigned to each primary data storage area, and said plurality of assigned secondary data storage areas are physically contiguous areas and said assigning means includes a pointer in the primary data storage area to which said plurality of said secondary data storage areas are assigned.

14. A data writing and reading method for a data storage medium in which data is updated but not overwritten, said method comprising:
- allocating primary and secondary data storage areas;
- assigning each secondary data storage area to one of the primary data storage areas;
- writing original data and subsequent updated data to the data storage areas in a data write order in which data is first written to one primary data storage area and then to each secondary data storage area assigned to that one primary data storage area before data is written to the next primary data storage area; and
- finding current data by reading the data storage areas in a data read order in which data is read only from primary data storage areas until after an unwritten primary data storage area is found.

15. The method claimed in claim 14, in which said finding step additionally includes reading each secondary data storage area assigned to the primary data storage area preceding the unwritten primary data storage area to identify the last written data storage area in the write order.

16. The method claimed in claim 14 in which the primary data storage areas are allocated as contiguous areas of the data storage medium.

17. The method claimed in claim 16 wherein a plurality of secondary data storage areas are allocated to each primary data storage area and each said plurality of secondary data storage areas is allocated as contiguous areas of the data storage medium.

18. The method claimed in claim 14 in which a pointer to the next to be written data storage area is written with the data each time data is written in said write order.

19. The method claimed in claim 14 in which a pointer to an assigned secondary data storage area and a pointer to the next primary storage area are written with the data each time data is written to a primary data storage area.

20. A data reading and writing system comprising in combination:
- a memory storage medium including numerous data storage areas allocated as a sequence of primary areas and as groups of secondary areas assigned to the primary areas;
- a read/write means for writing data to and reading data from the medium;
- control means connected to said read/write means for writing data and its subsequent updates to the data storage areas and for finding the most recent data update;
- said control means writing data in a data write order in which data is written to a first primary area and then to the group of secondary areas assigned to the first primary area before data is written to a second primary area; and
- said control means finding the most recent data update by reading data from the data storage areas in a data read order in which data is read only from said primary areas in sequence until the last written primary area is found and then data is read from the group of secondary areas assigned to the last written primary area until the last written secondary area is found.

21. A data reading and writing system as claimed in claim 20 further comprising pointers written in each said data storage area pointing to the next data storage area in the data write order and pointing to the next data storage area in the data read sequence.

22. A data reading and writing system as claimed in claim 20 wherein said primary areas are contiguous on said medium.

23. A data reading and writing system as claimed in claim 22 wherein said secondary areas of each group are contiguous on said medium.

* * * * *